United States Patent
Kuster et al.

(10) Patent No.: US 11,548,812 B2
(45) Date of Patent: *Jan. 10, 2023

(54) METHOD FOR PRODUCING A PRINTED, COATED PANEL

(71) Applicant: SAINT-GOBAIN GLASS FRANCE, Courbevoie (FR)

(72) Inventors: Hans-Werner Kuster, Aachen (DE); Li-Ya Yeh, Geilenkirchen (DE); Sebastian Janzyk, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 292 days.

This patent is subject to a terminal disclaimer.

(21) Appl. No.: 16/767,875

(22) PCT Filed: Nov. 9, 2018

(86) PCT No.: PCT/EP2018/080704
§ 371 (c)(1),
(2) Date: May 28, 2020

(87) PCT Pub. No.: WO2019/105712
PCT Pub. Date: Jun. 6, 2019

(65) Prior Publication Data
US 2020/0369562 A1    Nov. 26, 2020

(30) Foreign Application Priority Data
Nov. 30, 2017 (EP) .................................... 17204639

(51) Int. Cl.
*C03C 17/38* (2006.01)
*C03B 25/00* (2006.01)
*C03C 17/00* (2006.01)

(52) U.S. Cl.
CPC ............ *C03C 17/38* (2013.01); *C03C 17/002* (2013.01); *C03C 2218/118* (2013.01);
(Continued)

(58) Field of Classification Search
CPC ................................................ C03C 2218/328
See application file for complete search history.

(56) References Cited

U.S. PATENT DOCUMENTS

2004/0086652 A1    5/2004   Degand
2006/0257670 A1    11/2006  Brochot et al.
(Continued)

FOREIGN PATENT DOCUMENTS

DE    10 2014 112822 A1    3/2016
FR        2 843 913 A1     3/2004
(Continued)

OTHER PUBLICATIONS

International Search Report as issued in International Patent Application No. PCT/EP2018/080704, dated Jan. 18, 2019.
(Continued)

*Primary Examiner* — Cynthia Szewczyk
(74) *Attorney, Agent, or Firm* — Pillsbury Winthrop Shaw Pittman LLP

(57) ABSTRACT

A method for producing a coated and printed glass panel, includes providing a glass substrate having a metal-containing coating on at least one first surface and a polymeric protective layer arranged on this metal-containing coating, removing the temporary polymeric protective layer and the metal-containing coating only in a predetermined region, applying a ceramic ink in the predetermined region, wherein the removing is carried out with a laser and the polymeric protective layer and the metal-containing coating are intact outside the predetermined region after the removing.

14 Claims, 3 Drawing Sheets

(52) U.S. Cl.
CPC .... *C03C 2218/119* (2013.01); *C03C 2218/31* (2013.01); *C03C 2218/328* (2013.01); *C03C 2218/355* (2013.01)

(56) References Cited

U.S. PATENT DOCUMENTS

| | | | |
|---|---|---|---|
| 2011/0027554 A1 | 2/2011 | Gouardes et al. | |
| 2015/0376935 A1* | 12/2015 | Greiner | E06B 3/6722 65/41 |
| 2016/0169531 A1* | 6/2016 | Wagner | B32B 3/30 264/400 |
| 2016/0194516 A1* | 7/2016 | Nadaud | C09D 5/008 118/200 |

FOREIGN PATENT DOCUMENTS

| | | | | |
|---|---|---|---|---|
| JP | 05310442 A | * | 11/1993 | ............. C03C 17/06 |
| JP | 2003245784 A | * | 9/2003 | ......... B23K 26/0624 |
| RU | 2325957 C2 | | 6/2008 | |
| RU | 2378230 C2 | | 1/2010 | |
| RU | 2421419 C2 | | 6/2011 | |
| WO | WO 2011/090784 A1 | | 7/2011 | |
| WO | WO-2012132935 A1 | * | 10/2012 | ............. C03C 17/00 |
| WO | WO-2014033007 A1 | * | 3/2014 | ......... B23K 26/0006 |
| WO | WO 2014/133929 A2 | | 9/2014 | |
| WO | WO 2015/019022 A1 | | 2/2015 | |

OTHER PUBLICATIONS

Office Action as issued in Mexican Patent Application No. MX/a/2020/005550, dated Aug. 8, 2022.

Official Action and Search Report as issued in Russian Patent Application No. 2020121169/03(036151), dated Feb. 8, 2021.

* cited by examiner

METHOD FOR PRODUCING A PRINTED, COATED PANEL

CROSS-REFERENCE TO RELATED APPLICATIONS

This application is the U.S. National Stage of PCT/EP2018/080704, filed Nov. 9, 2018, which in turn claims priority to European patent application number 17 204 639.3 filed Nov. 30, 2017. The content of these applications are incorporated herein by reference in their entireties.

The invention relates to a method for producing a printed, coated glass panel; an apparatus for carrying out the method; a printed, coated panel; and use thereof.

Currently, glass is becoming increasingly important as a building material. Architects sometimes design complete façades made of glass elements. In order to realize buildings that are not only of high quality aesthetically but also, at the same time, energy-efficient, coated glass substrates that, for example, reduce solar radiation and thus lower costs for air conditioning are used.

Many different coatings are known. There are, for example, glasses with antireflective coatings, thermally improving coatings (low-E, solar protection), or heatable layers. Many of these coatings are not very stable mechanically and are, in particular, scratch-sensitive and corrosion-susceptible. In particular, silver-based layers are very sensitive in this regard.

During production of such glass elements for the architectural sector, the glass substrates pass through various process steps. Usually, a coating that consists, in many cases, of multiple thin layers is applied on a mostly clear float glass. After coating, the glass must also pass through a toughening process. For this, it is exposed to temperatures above 600° C. However, this toughening process does not always take place immediately. The coated glass must, consequently, be storable for a few weeks to months and must also be able to withstand transport to a different processing site.

There are various approaches to protecting the coated glass. One variant is a peelable film that protects the coating during storage and that can be peeled off before toughening. Another solution is a polymeric protective layer that can be washed off with water, as is described in DE102014112822A1. A further solution is a polymeric protective layer that is removed without residue during toughening at the high temperatures present then. The last solution is described in US2016194516A1.

In the building glass sector, increasingly frequently panels with imprints of various types are used. For example, glasses with black prints in the edge region that conceal fastening elements or sensors are increasingly used. The ink is is typically a ceramic ink, which is fired for fixing during the toughening process. The combination of an imprint with a coating is a challenge. In the case of direct printing on a metal-containing coating, there are, namely, disturbing optical effects after firing.

WO2014/133929 describes a method in which an ink is used directly on metal-containing coating. A disadvantage of this method is that this ink cannot be used on a polymeric protective layer that protects the metal-containing coating. The metal-containing coating would then be unprotected during storage and transport to the printer, often situated at a different production site or in a different operation from the coating equipment. A peelable film that would have to be removed in a separate step before printing and before toughening would have to be used to protect the metal-containing coating.

When the polymeric protective layer is to be combined with a printing operation, the polymeric protective layer and the metal-containing coating must be removed in the region to be printed. One possibility is mechanical removal of the protective layer and the metal-containing coating. The printing can then be carried out in the de-coated region, while, at the same time, the metal-containing coating continues to be protected by a polymeric protective layer in the remaining region. However, during mechanical removal of the coating with a suitable grinding wheel, small scratches and damage occur in the de-coated region. In particular, after the toughening process, these are clearly visible despite the printing and mar the optical appearance. Abrasive removal is not always residue free. A further problem with this method is that exact positioning of the print at the edge of the coated region is necessary. Otherwise, optical errors develop at the boundary between the print and the coating: If the print is too far from the coating, this creates an area without coating that appears lighter than the rest of the panel (cf. FIG. 4$a$). If the print is applied over the metal-containing coating, there are optical defects in the printed region (cf. FIG. 4$b$). Mechanical removal does not provide an adequately sharp boundary line between the de-coated and the coated region. Subsequent exact alignment of the printing at this edge is therefore too imprecise and the above-described optical defects occur.

The object of the present invention is to provide an improved method for producing a coated and printed glass panel and to provide an apparatus for carrying out the method.

The object is accomplished according to the invention by a method in accordance with the independent claim 1. Preferred embodiments are apparent from the dependent claims.

The method for producing a coated and printed glass panel comprises at least the following steps, in the order indicated:

a) Providing a glass substrate having a metal-containing coating on at least one first surface and a polymeric protective layer arranged on this metal-containing coating, b) Removing the polymeric protective layer and the metal-containing coating only in a predetermined region, c) Applying a ceramic ink only in the predetermined region.

In step c), the ceramic ink is applied exclusively in the predetermined region and not in the region provided with the polymeric protective layer. Thus, unsightly results after the firing of the ink are avoided.

Step b) is carried out with a laser. After step b), the polymeric protective layer and the metal-containing coating are still intact outside the predetermined region. This means that in step b), the polymeric protective layer and the metal-containing coating are not removed outside the predetermined region. However, after step b), both the polymeric protective layer and the metal-containing coating are removed in the entire predetermined region. The provision of a glass substrate, on whose first surface a metal-containing coating and a polymeric protective layer had been arranged in step a), can be done in the following two steps:

a1) Applying a metal-containing coating on a first surface of a glass substrate, and a2) Applying a polymeric protective layer on the metal-containing coating.

The method according to the invention thus provides a glass panel, which includes at least one metal-containing coating that is protected by a polymeric protective layer and that, at the same time, contains a ceramic imprint that is applied in a de-coated region. Previously, according to the prior art, such a panel could be obtained only through the use of an abrasive for de-coating, with inevitable creation of small scratches in the de-coated region. The panel produced in accordance with the method according to the invention has, in contrast, no scratches since the laser causes no disturbing damage during de-coating. In addition, the boundary line between the de-coated (predetermined) region is smooth and sharp such that alignment of the subsequent ink application in step c) is better possible and thus less waste is produced due to optical defects at the boundary between the coating and the printing.

The glass substrate is preferably a clear or colored float glass. The thickness of the glass substrate is between 2 mm and 20 mm, preferably between 4 mm and 10 mm. Customary thicknesses are 2 mm, 3 mm, 4 mm, 5 mm, 6 mm, 8 mm, 10 mm, 12 mm, 15 mm, and 19 mm.

The glass substrate has a first surface and an opposite second surface. Preferably, only the first surface was provided with a metal-containing coating.

Alternatively, the first surface and the second surface were preferably provided with a metal-containing coating. In this case, both surfaces were preferably provided with a polymeric protective layer.

The glass panel is intended in particular as a window pane for building glazing.

The metal-containing coating is, in the context of the present invention, a coating that includes at least one functional layer containing a metal compound. The metal-containing coating is preferably a heatable coating or an IR-reflecting coating. The metal-containing coating can be a single functional layer, but is typically a multilayer system. The coating includes at least one functional layer. Typically, the metal-containing coating includes dielectric layers and other layers, which, as anti-reflection layers, blocking layers, or surface adaptation layers, optimize the optical, electrical, and/or mechanical properties of the metal-containing coating. The at least one functional layer can contain a metal or a metal alloy or an oxide. In a preferred embodiment, the at least one functional layer contains silver. The silver content of the functional layer is preferably greater than 50% (weight percent), particularly preferably greater than 90% (weight percent). The functional layer consists most particularly preferably substantially of silver, apart from any impurities or doping. The metal-containing coating can preferably contain a plurality of functional layers that are separated from one another by dielectric layers. The metal-containing coating preferably contains at least two, particularly preferably two or three, functional layers, in particular silver-containing layers. Typical materials common for the dielectric layers of the conductive coating are, for example, silicon nitride, silicon oxide, zinc oxide, tin zinc oxide, and aluminum nitride. The metal-containing coating is typically a thin-film stack. Typical thicknesses of the coating are less than 1 μm. Typical thicknesses of the functional layers are in the range from 5 nm to 50 nm for silver-containing layers. Suitable multilayer systems are described, for example, in US2011027554A1 and in US20060257670A1. Suitable coated glass substrates are marketed by SAINT GOBAIN GLASS under the name COOL-LITE®, in particular COOL-LITE® SKN and COOL LITE® XTREME.

The metal-containing coating can be applied by the known methods, such as magnetron sputtering, chemical vapor deposition (CVD), plasma-enhanced CVD (PECVD), pyrolysis, sol-gel methods, or wet chemical methods. Preferably, the metal-containing coating is deposited by magnetron sputtering.

The polymeric protective layer in the context of the invention preferably has a thickness of at least 1 μm, is not water-soluble, and is produced from a composition that contains meth(acrylates). "Not water-soluble" mean that the protective layer also withstands a customary washing operation of the panel. The polymeric protective layer is a temporar 5 polymeric protective layer. The term "temporary" indicates that the protective layer is applied only for protection during storage or transport of the glass panel. Suitable protective layers are described in US2016194516A1. The polymeric protective layer in the context of the invention is not peelable, but, instead, is removed by thermal decomposition.

The predetermined region is the region that is intended for printing with a ceramic ink. The predetermined region is a flat region on the surface of the glass substrate. The size, outer shape, and the position of the predetermined region can be freely selected.

The ceramic ink, also called "enamel", is melted onto the glass during the toughening process and forms a firm bond with the glass matrix. Common ink compositions, as known from the prior art for black prints on glass, can be selected as ceramic ink. Usually, a ceramic ink contains as components glass formers (silicon dioxide and/or barium oxide), fluxes, which influence melting (e.g., $Na_2$, $K_2O$, $Li_2$, CaO, MgO, SrO, BaO), and other oxides such as aluminum oxide, zinc oxide, zirconium oxide. In addition, inorganic color pigments are used for coloring. The components can be suspended in a medium to enable the printing operation. Considered here are organic and/or aqueous solutions. The ceramic ink can be applied by screen printing, rolling (also called roller coating), or digital printing. Preferably used are opaque ceramic inks.

In another preferred embodiment of the method according to the invention, after the above described steps a) to c), in a further step d), the glass panel is subjected a temperature treatment at >600° C. Here, the temporary polymeric protective layer is removed on the entire first surface and the ceramic ink is fired in the predetermined region. Thanks to the method according to the invention, a toughened glass panel having a metal-containing coating and an imprint in a limited de-coated region is thus obtained.

The method does not require separate steps for removal of the polymeric protective layer. The polymeric protective layer decomposes at the high temperatures without residue such that no separate waste has to be disposed of. At the same time, the metal-containing coating is protected by the temporary polymeric protective layer during the printing process.

The fact that the polymeric protective layer is present at the beginning of the temperature treatment has a surprisingly positive effect. During the temperature treatment, the printed region and the coated region heat up with different intensities. A body heats up depending on its emissivity ($\varepsilon$=emissivity). The emissivity of a body indicates how much radiation it emits compared to an ideal heat radiator, i.e., a black body. The emissivity of the ideal black body is 100%.

The region of the glass panel that is printed (E typically between 70% and 99%), heats up the most (in particular with a black print). The metal-containing coating alone has a very low emissivity ($\varepsilon$ typically between 0.5% and 4%), since it reflects heat and thus heats up very little. Without a polymeric protective layer, there would thus be a large temperature difference between a printed region and the region with a metal-containing coating. This results in optical defects in the end product, such as wave formation in the finished product.

Thanks to the polymeric protective layer (E of a glass panel with a metal-containing coating and polymerer protective layer is typically greater than 40%), the temperature difference between a printed and a coated region is less. Thus, the heating of the entire glass panel is more uniform than without the polymeric protective layer. In particular, the difference during heating between the printed region without metal-containing coating and the region with the metal-containing coating is thus reduced. Due to the more uniform temperature distribution over the glass surface during the temperature treatment, the end product has fewer optical defects/irregularities. In addition, compared to a method without the polymeric protective layer, heating times are significantly reduced.

In a preferred embodiment of the method according to the invention, the glass panel is thermally toughened in the above-described temperature treatment, wherein, in particular, single-pane safety glass (ESG) or partially toughened glass (TVG) is obtained. Therein, after heating the glass panel to temperatures above 600° C., preferably 620° C. to 700° C., the glass panel is rapidly cooled starting from the surfaces. Usually, the cooling is done by blowing with air. This creates permanent tensile stress in the interior of the glass panel and permanent compressive stress on the surfaces and at the edges. Consequently, thermally toughened glass has a higher mechanical destruction threshold than non-toughened float glass. Single-pane safety glass should generally have a degree of tempering at the surface of at least 69 MPa. In the case of partially toughened glass, surface compressive stresses of 24-52 MPa are achieved.

In another preferred embodiment of the method according to the invention, the ceramic ink is applied with a roll coater or a digital printer. The application by rolling with a roll coater is particularly advantageous in connection with flat edge printing. The ink is applied to the glass panel with a fluted rubber roller. On close observation, the fluted structure of the roller is visible on the side of the ink application. In the case of digital printing, the ceramic ink is applied to the glass surface in the manner of an inkjet printer. This method is particularly suitable for complex or multicolored designs or images.

In another preferred embodiment of the method according to the invention, the predetermined region is subjected to plasma cleaning before the application of the ceramic ink. This removes any contaminants possibly adhering to the surface. At the same time, the surface is optimally prepared for the subsequent application of ink. Preferred is cleaning with atmospheric plasma, which enables immediate further processing of the glass.

Alternatively, or in addition to plasma cleaning, the panel can be washed and dried before printing. Customary aqueous washing solutions or pure water can be used.

In another preferred embodiment of the method according to the invention, the application of the ceramic ink is done in the predetermined region under camera control, with the camera detecting a difference between the de-coated predetermined region and the region provided with the polymeric protective layer. As result of aligning the printer using a camera, the number of defects during printing can be further reduced. In particular, this prevents the occurrence of unprinted or overprinted regions that disrupt the optical appearance (cf. FIG. 4).

In another preferred embodiment of the method according to the invention, the glass panel is between 1 $m^2$ and 54 $m^2$ in size. The method according to the invention is particularly advantageous for large glass panels because, due to the presence of the polymeric protective layer during the toughening process, uniform heating of the glass panel occurs and heating times can be reduced. Preferably, the glass panel is between 3 $m^2$ and 40 $m^2$ in size. Particularly preferably, the glass panel has a size between 10 $m^2$ and 30 $m^2$.

In another preferred embodiment of the method according to the invention, the predetermined region extends along at least one edge of the glass panel and has, measured from the panel edge, a width b between 0.5 cm and 30 cm, preferably between 1 cm and 20 cm, particularly preferably between 2 cm and 10 cm. Preferably, the printing is carried out along all edges of the panel. With a rectangular panel, this results in frame-like printing of the panel with a masking print at the edge of the panel. This frame-like printing is usually used to cover fastening means of the panel. The frame preferably has the same width along all panel edges.

In another preferred embodiment of the method according to the invention, the polymeric protective layer is not water-soluble and is produced from a composition that contains meth(acrylates). Thus, the protective layer protects particularly well against wetness and remains intact even during the customary washing operations. The polymeric protective layer is cured or cross-linked by drying, by IR or UV radiation, or by electron beam cross-linking.

Preferably, the polymeric protective layer has a thickness of 1 μm to 30 μm, preferably 15 μm to 20 μm. With these thicknesses, sufficient scratch resistance is obtained to protect the underlying layer during storage and transport.

The term meth(acrylates) refers to esters of acrylic acid or methacrylic acid containing at least one acryloyl ($CH_2$=CH—CO—) or methacryloyl ($CH_2$=CH($CH_3$)—CO—) function. These esters can be monomers, oligomers, pre-polymers, or polymers. When these meth(acrylates) are reacted under polymerization conditions, a polymer network with a solid structure is obtained.

In another preferred embodiment of the method according to the invention, the metal-containing coating has an IR-reflecting function and contains at least two silver-containing layers and at least three dielectric layers. The silver-containing layers are made of silver or a silver compound. IR-reflecting means that, in particular, the part of the solar spectrum in the nonvisible range between 780 nm and 2500 nm is largely reflected. Thus, in the case of building glazing or vehicle glazing, heating of the interior is effectively avoided. Preferably, the at least two silver-containing layers and the at least three dielectric layers are arranged such that each silver-containing layer is surrounded by two dielectric layers, i.e., the layers are alternatingly arranged.

A further aspect of the present invention is the glass panel produced by the method according to the invention.

A further aspect of the invention is the provision of an apparatus for carrying out the method according to the invention. The apparatus comprises at least one laser scanner and a roll coater or a digital printer. Since, in the de-coating step, a laser is used, and no mechanical abrasive that also generates dust is used, it is possible to combine the printing device, i.e., a roll coater or a digital printer, into one apparatus with the laser. If necessary, the particles created during de-coating with the laser can be extracted with a suction device. The term "into one apparatus", means that the components are arranged in one production line. It is possible for the operations to occur in different rooms, but the individual workstations are connected via conveyor belts or transport equipment.

Preferably, the laser processing takes place under atmospheric conditions. Exclusion of oxygen is not absolutely necessary. Due to the presence of the polymeric protective layer, the metal-containing coating is surprisingly sufficiently protected against corrosion at the boundaries of the predetermined region. Without the presence of the temporary protective layer, the metal-containing coating would be oxidized by the oxygen present and the high energy input from the laser. Thus, surprisingly, no separate chamber with a protective gas atmosphere is necessary.

In another preferred embodiment of the apparatus according to the invention, the apparatus includes a laser scanner and a roll coater that are mounted in one axis. This apparatus enables particularly precise alignment of the roll coater, resulting in lower error tolerances in the positioning of the print.

In another preferred embodiment of the apparatus according to the invention, it also includes an apparatus for plasma cleaning. The apparatus for generating a plasma is arranged downstream from the laser scanner in the production line and prepares the glass surface for the subsequent application of ink. The product obtained with this apparatus has an even better print and is, in particular, advantageous in combination with more complex imprints, which are generated, for example, by a digital printer. Since the thickness of the ink film created by a digital printer is thinner than the ink film produced by a roll coater, a particularly clean surface is advantageous.

The lasering is done by at least one 2D laser scanner. These laser scanners are arranged perpendicular to the surface of the coated glass substrate. The 2D laser scanner has a maximum working area with a width of 3 m and a length of 18 m. The 2D laser scanner can be mounted on an axis such that it can be moved accordingly within the entire working area.

Pulsed solid state lasers or fiber lasers are preferably used as the laser source. Particularly preferably used is a neodymium-doped yttrium-aluminum-garnet laser (Nd:YAG laser). Alternatively, ytterbium (Yb:YAG-laser) or erbium (Er:YAG-laser) can be used as doping materials or titanium:sapphire laser or or neodymium-doped yttrium-vanadate-laser (Nd:YV04-laser) can be used. The Nd:YAG-laser emits infrared radiation with a wavelength of 1064 nm. However, by frequency doubling or frequency tripling even radiation of wavelengths 532 nm and 355 nm can be produced.

When using a 2D laser scanner, the laser beam generated by the laser source strikes a beam expander and is deflected from there to the 2D laser scanner by a mirror.

The lasering is done with a wavelength of 300 nm to 1300 nm. The wavelength used depends on the type of coating. The Nd:YAG-laser preferably used can provide laser radiation of the wavelengths 355 nm, 532 nm, and 1064 nm. A wavelength of 532 nm is preferably used for processing silver coatings.

The lasering is preferably done with a power of 1 W to 150 W, particularly preferably with a power of 10 W to 100 W.

A further aspect of the present invention is the use of the glass panel produced with the method according to the invention as building glazing indoors or outdoors, preferably as part of an insulating glazing.

BRIEF DESCRIPTION OF THE DRAWINGS

In the following, the invention is explained in detail with reference to drawings and exemplary embodiments. The drawings are schematic representations and not to scale. The drawings in no way restrict the invention.

They Depict:

FIG. 1 depicts a plan view of a glass panel 1 according to the invention and FIG. 2 a cross-section through an edge region of the glass panel 1. The glass panel 1 is a 1 m×1 m glass panel with a thickness of 6 mm. The glass substrate 2 is a clear float glass, as is marketed, for example, by SAINT GOBAIN GLASS under the name PLANICLEAR®. A silver-containing IR-reflecting coating 4 is applied on the first surface 3.1 of the glass substrate 2. The coating 4 contains two functional silver layers that are arranged alternatingly with 3 dielectric layers. The total thickness of the metal-containing coating 4 is between 150 nm and 200 nm. A temporary polymeric protective layer 5 is arranged on the metal-containing coating 4. The polymeric protective layer is produced from a composition that contains meth(acrylates) and was cross-linked under UV light. The polymeric protective layer 5 has a thickness of 15 μm. A suitable polymeric protective layer is offered by SAINT GOBAIN GLASS under the name EASYPRO®. A black ceramic ink 7 is applied in the predetermined region 6. The predetermined region 6 forms a frame around the glass panel 1 with a width b of 10 mm. The frame serves as a masking print behind which the fastening materials and the edge seal of the finished insulating glazing panel are hidden.

Figure 1:
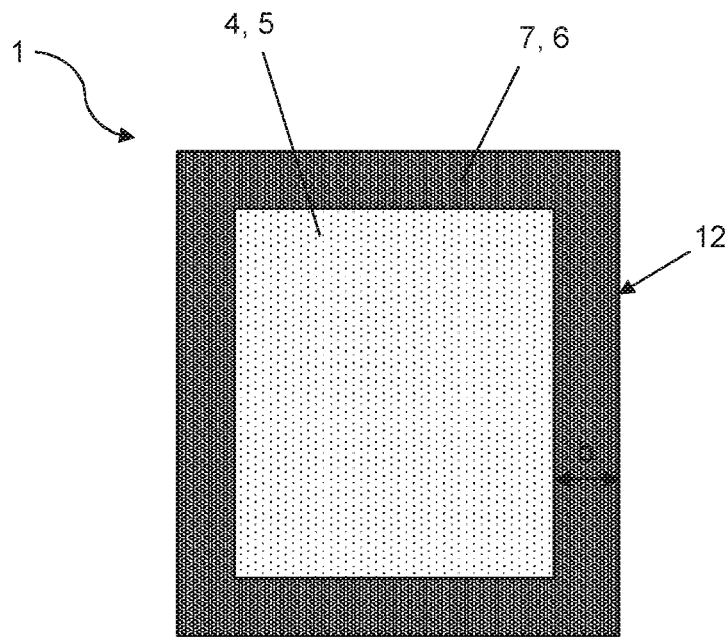
FIG. 1 a plan view of a glass panel produced in accordance with a method according to the invention, FIG. 2 a cross-section through the edge region of a glass panel produced in accordance with the method according to the invention, FIG. 3 a schematic representation of a method according to the invention, and FIG. 4 a schematic representation of errors that can occur during the printing of glass panels.
Figure 2:
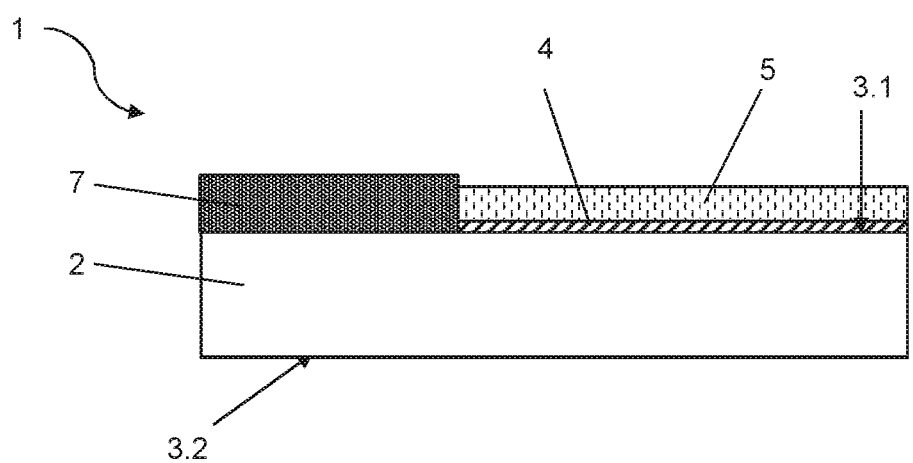
Figure 3:
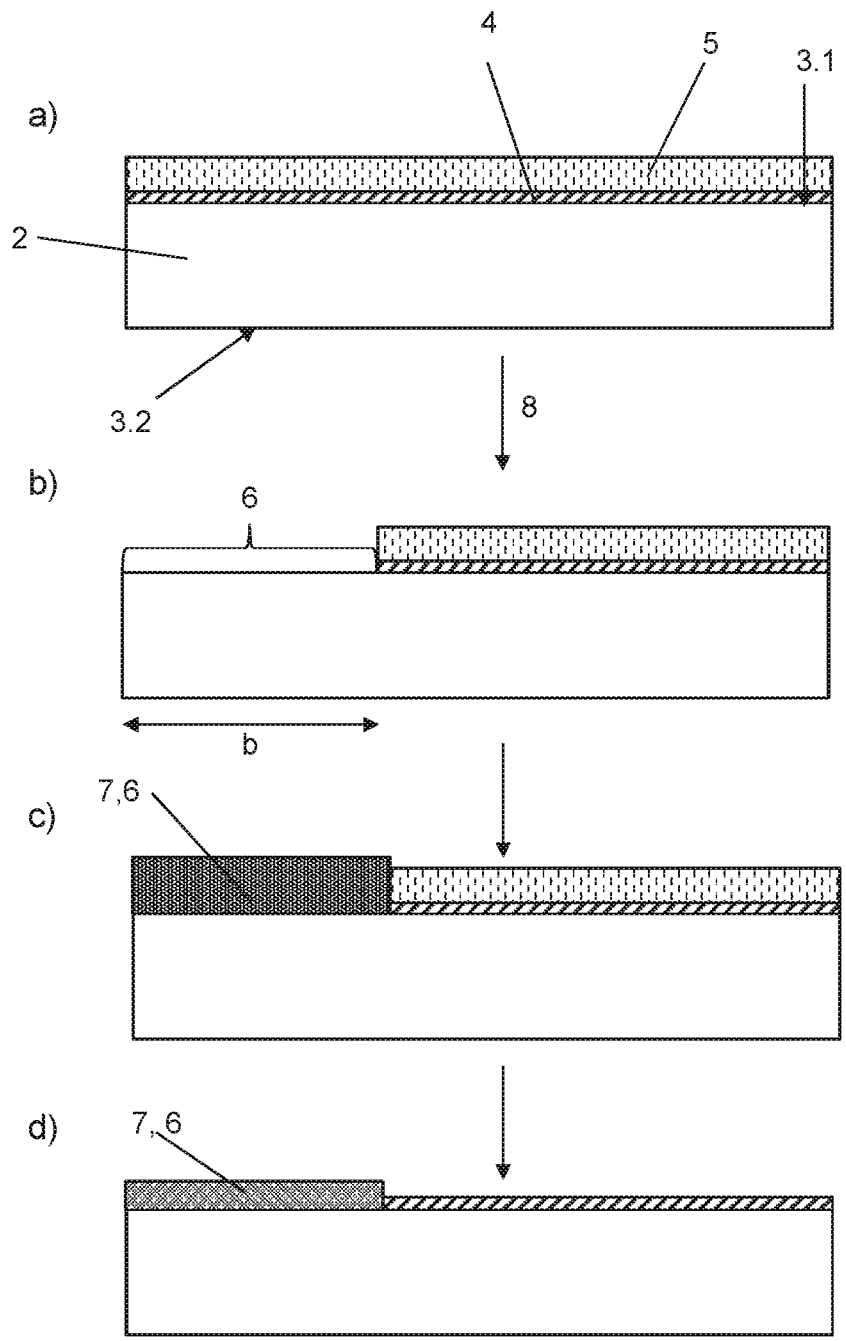
FIG. 3 is a schematic representation of the method according to the invention. Step a) starts with a 6-mm-thick glass substrate 2 with a metal-containing coating 4 with a total thickness of 200-250 nm comprising three silver layers and four dielectric layers, with the metal-containing coating 4 being covered by a 15-μm-thick polymeric protective layer 5. The first surface 3.1 of the glass substrate 2 is provided over its entire area with the layers 4 and 5. In step b), the predetermined region 6 with the width b=20 mm is de-coated using a 2D laser scanner. The de-coating takes place under ambient conditions without exclusion of oxygen. In the following step c), a black ceramic ink 7 is applied in the de-coated region 6. In the last step d), the panel 1 is subjected to a temperature treatment at 690° C. for 8 minutes. Simultaneously, the panel 1 is toughened, the polymeric protective layer 5 is removed without residue, and the ceramic ink 7 bonds with the glass surface and is fired. In the drawing, the firing is indicated by a different hatching and a thinner ink layer.
Figure 4A:
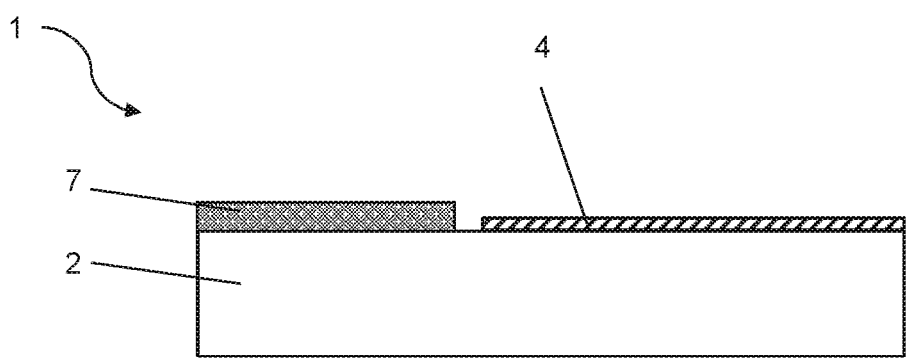
FIG. 4 depicts two error patterns that can develop as a result of incorrect alignment of the print. In FIG. a), the print is not positioned exactly adjacent the metal-containing coating such that a bright line develops along the print that disrupts the optical appearance of the product. In FIG. b), the print is positioned partially overlapping the metal-containing coating, likewise resulting in optical defects.
Figure 4B:
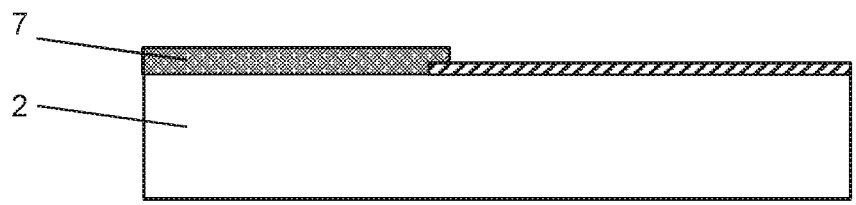

In the following, the advantages of the method according to the invention (Example) are explained in comparison with a prior art method (Comparative Example).

In both cases, a 1 m×2 m glass substrate of clear float glass was produced with the same silver-containing coating comprising 3 functional silver layers. A black edge printing in the shape of a frame was applied with different widths b. After printing, the panels were toughened at a temperature of 690° C. for a period of 500 seconds. The thermal emissivity was determined using an INGLAS TIR100-2.

EXAMPLE

Glass panel: 1 m×2 m clear float gas
Metal-containing coating: contains 3 silver layers
Polymeric protective layer: 15 μm SGG EasyPro®; (meth)acrylate-based layer
Emissivity of the unprinted region (metal-containing coating and polymeric protective layer; measured before the temperature treatment): 45%
Emissivity of the printed region (measured after the temperature treatment): 89%

COMPARATIVE EXAMPLE

Glass panel: 2 m×1 m clear float glass
Metal-containing coating: contains 3 silver layers
Emissivity of the unprinted region (only metal-containing coating; measured before the temperature treatment): 2%
Emissivity of the printed region (measured after the temperature treatment): 89%

| Width b of the frame in mm | Deformation in mm measured at a distance of 5 mm from the edge of the glass panel | |
|---|---|---|
| | Example (with polymeric protective layer) | Comparative Example (without polymeric protective layer) |
| 24 | None | 0.10 |
| 96 | 0.05 | 0.15 |
| 192 | 0.10 | Glass breakage |

The deformation was measured as a change in thickness of the glass panel at a distance of 5 mm from the edge. The comparison shows that the method according to the invention results in substantially less or no deformation at all in the printed region. In the case of larger frame prints, there was even glass breakage without the use of a protective layer.

LIST OF REFERENCE CHARACTERS 1 glass panel
2 glass substrate
3.1 first surface of the glass substrate
3.2 second surface of the glass substrate
4 metal-containing coating
5 polymeric protective layer, temporary protective layer
6 predetermined region, de-coated region
7 ceramic ink
8 laser, laser scanner
12 a panel edge
b width of the predetermined region

The invention claimed is:

1. A method for producing a coated and printed glass panel, comprising:
   a) providing a glass substrate having a metal-containing coating on at least one first surface and a polymeric protective layer arranged on said metal-containing coating,
   b) removing the temporary polymeric protective layer and the metal-containing coating only in a predetermined region, wherein step b) is carried out with a laser,
   c) after step b), applying a ceramic ink only in the predetermined region, wherein the polymeric protective layer and the metal-containing coating are intact outside the predetermined region after step c),
   d) after step c), subjecting the glass panel to a temperature treatment greater than 600° C., wherein the polymeric protective layer is removed on the entire first surface and the ceramic ink is fired in the predetermined region, wherein the glass panel is thermally toughened during the temperature treatment.

2. The method according to claim 1, wherein the ceramic ink is applied with a roll coater or a digital printer.

3. The method according to claim 1, wherein the predetermined region is subjected to plasma cleaning before the application of the ceramic ink.

4. The method according to claim 1, wherein the application of the ceramic ink is done in the predetermined region under camera control, wherein the camera detects a difference between the de-coated predetermined region and the region provided with the polymeric protective layer.

5. The method according to claim 1, wherein the glass panel is between 1 m² and 54 m² in size.

6. The method according to claim 5, wherein the glass panel is between 3 m² and 40 m² in size.

7. The method according to claim 6, wherein the glass panel is between 10 m² and 30 m² in size.

8. The method according to claim 1, wherein the predetermined region extends along at least one edge of the glass panel and, measured from the panel edge, has a width b between 0.5 cm and 30 cm.

9. The method according to claim 8, wherein the width b is between 1 cm and 20 cm.

10. The method according to claim 1, wherein the polymeric protective layer is not water-soluble and is produced from a composition that contains meth(acrylates).

11. The method according to claim 1, wherein the metal-containing coating has an IR-reflecting function and contains at least two silver-containing layers as well as at least three dielectric layers.

12. A method comprising utilizing the glass panel produced in a method according to claim 1 as building glazing indoors or outdoors.

13. The method according to claim 12, wherein the glass panel is part of an insulating glazing.

14. The method according to claim 1, wherein the thermally toughened glass panel is a single-pane safety glass or is partially toughened.

* * * * *